(12) United States Patent
Chandrahasan et al.

(10) Patent No.: US 11,720,533 B2
(45) Date of Patent: Aug. 8, 2023

(54) AUTOMATED CLASSIFICATION OF DATA TYPES FOR DATABASES

(71) Applicant: International Business Machines Corporation, Armonk, NY (US)

(72) Inventors: Rajmohan Chandrahasan, Kanchipuram (IN); Ankush Gupta, Uttarakhand (IN); Venkata Nagaraju Pavuluri, New Rochelle, NY (US); Arvind Agarwal, New Delhi (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/536,860

(22) Filed: Nov. 29, 2021

(65) Prior Publication Data
US 2023/0169050 A1 Jun. 1, 2023

(51) Int. Cl.
*G06F 16/21* (2019.01)
*G06F 16/22* (2019.01)
(Continued)

(52) U.S. Cl.
CPC ........ *G06F 16/213* (2019.01); *G06F 16/2282* (2019.01); *G06F 16/2358* (2019.01);
(Continued)

(58) Field of Classification Search
CPC ............... G06F 16/213; G06F 16/2282; G06F 16/2358; G06F 16/2462; G06F 18/2178; G06N 3/045
See application file for complete search history.

(56) References Cited

U.S. PATENT DOCUMENTS 9,996,558 B2    6/2018  Nelke et al.
2015/0066987 A1*  3/2015  Nelke ................. G06F 16/21
                                                707/781
(Continued)

FOREIGN PATENT DOCUMENTS

CN    111104466 A    5/2020
CN    107357902 B    5/2021

OTHER PUBLICATIONS

Y. Liu et al., "Application of Master Data Classification Model in Enterprises," 2020 IEEE 4th Information Technology, Networking, Electronic and Automation Control Conference, May 13, 2020, 5 pages.

(Continued)

*Primary Examiner* — Matthew J Ellis
(74) *Attorney, Agent, or Firm* — Daniel Yeates; Ryan, Mason & Lewis, LLP

(57) ABSTRACT

Techniques for automatically determining different data types found in databases are disclosed. In one example, a computer implemented method comprises receiving a portion of identifying information for one or more components of a database, and generating one or more descriptions for the one or more components based at least in part on the portion of the identifying information for the one or more components. The one or more descriptions are inputted to one or more machine learning models, and, using the one or more machine learning models, one or more data types associated with the one or more components are predicted. The prediction is based at least in part on the one or more descriptions.

20 Claims, 10 Drawing Sheets

500

| Table Name | Column Name | Character/n-Grams | Expanded Terms |
|---|---|---|---|
| BACKORDER_ACT_CODES | ACT_CODE | Act Code | Act → Action |
|  | ACT_TYPE | Act Type | Act → Action |
|  | DESC | Desc | Desc → Description |
|  | DISPLAY_SEQ | Display Seq | Seq → Sequence |
|  | CTRY_CDE | Ctry Cde | Ctry → Country, Cde → Code |
|  | MAINT_USER_ID | Maint User Id | Maint → Maintenance |
|  | MAINT_TIMESTAMP | Maint Timestamp | Maint → Maintenance |

(51) Int. Cl.
  *G06F 16/23*      (2019.01)
  *G06F 16/2458*    (2019.01)
  *G06F 18/21*      (2023.01)
  *G06N 3/045*      (2023.01)

(52) U.S. Cl.
  CPC ...... *G06F 16/2462* (2019.01); *G06F 18/2178* (2023.01); *G06N 3/045* (2023.01)

(56) References Cited

U.S. PATENT DOCUMENTS

| | | | |
|---|---|---|---|
| 2020/0073996 A1* | 3/2020 | Wright | G06N 5/022 |
| 2020/0104897 A1* | 4/2020 | Oh | G06N 7/01 |
| 2020/0151155 A1* | 5/2020 | Oberhofer | G06F 16/211 |
| 2022/0067294 A1* | 3/2022 | Chikoti | G06N 20/00 |
| 2022/0350810 A1* | 11/2022 | Majumdar | G06F 16/24578 |

OTHER PUBLICATIONS

W. Han et al., "Interestingness Classification of Association Rules for Master Data," Industrial Conference on Data Mining, Jul. 1, 2017, pp. 237-245.

M. Fluehr "Word Expander," https://loeb.nyc/blog/data-science-word-expander, Aug. 6, 2019, 16 pages.

D. Everett, "How AI Improves Master Data Management (MDM)," https://blogs.informatica.com/2021/05/31/10-ways-ai-improves-master-data-management/, May 30, 2021, 7 pages.

P. Mell et al., "The NIST Definition of Cloud Computing," Recommendations of the National Institute of Standards and Technology, Special Publication 800-145, Sep. 2011, 7 pages.

Oracle, "Primary Key-Foreign Key Relationships," https://docs.oracle.com/cd/E12100_01/books/admintool/admintool_DataModeling4.html, Mar. 11, 2004, 1 page.

* cited by examiner

| Table Name | Table Description | Data Type |
|---|---|---|
| ACTCDE | Action Codes | Reference |
| AP_TERMS | Account Payable Terms | Reference |
| CURR_EXCG_RATE | Currency Exchange Rates | Reference |
| CUS_INF | Customer Information File | Master |
| SUPPDET | Supplier Details | Master |
| PARTMGMT | Parts Management | Master |
| ORDDETTBL | Order Details | Transaction |
| INVTRM | Invoice Transaction Message | Transaction |
| BOM100DT | Bill of Material Detail File | Transaction |

| Table Name | Table Description | Data Type |
|---|---|---|
| BACKORDER_ACTION_CODES | Backorder Action Codes | Reference |
| INVTRM | Invoice Transactions Messages by Inv,Line,Seq | Transaction |
| CUS_INF | Customer Information File | Master |

| Table Names |
|---|
| INVOICE_DETAILS |
| INVOICE_REGISTRY |
| ITEM_MASTER |
| ITEM_LOCATION |
| ITEM_DETAILS |
| GEOGRAPHIC_LOCATION_DETAILS |
| BOL_DATA_REGISTRY |
| CONTAINER_DETAILS |
| RETURN_DETAILS |
| QUOTE_RESPONSE |
| SUPPLIER_ADDRESS |
| SUPPLIER_DETAILS |
| CUSTOMER_DETAILS_SOURCE |
| VENDOR_MASTER |
| PURCHASE_ORDER_DATA |
| TRACKING_CODES |
| TRACE_QUEUE |
| TAX_EXEMPT_SHIP_DETAILS |

| Table Names |
|---|
| ACTCDE |
| AP_Terms |
| BOMDT |
| BOLTRN |
| BOLDT |
| ITMCDE |
| ITMDESC |
| ITMRET |
| ITMLBL |
| ORDDT |
| ORDLOC |
| ORDMSG |
| FRTDT |
| FRTCHRG |

| Term | Definition |
|---|---|
| AP | Accounts Payable |
| ORD | Order |
| BOL | Bill of Lading |
| FRT | Freight |

| Table Name | Column Name | Character/n-Grams | Expanded Terms |
|---|---|---|---|
| BACKORDER_ACT_CODES | ACT_CODE | Act Code | Act → Action |
| | ACT_TYPE | Act Type | Act → Action |
| | DESC | Desc | Desc → Description |
| | DISPLAY_SEQ | Display Seq | Seq → Sequence |
| | CTRY_CDE | Ctry Cde | Ctry → Country, Cde → Code |
| | MAINT_USER_ID | Maint User Id | Maint → Maintenance |
| | MAINT_TIMESTAMP | Maint Timestamp | Maint → Maintenance |

AUTOMATED CLASSIFICATION OF DATA TYPES FOR DATABASES

BACKGROUND

Data modernization is the process of moving data from legacy databases to modern databases. Data modernization permits organizations to reduce unnecessary complexities surrounding legacy data and improve efficiency. Data modernization starts with establishing a baseline data inventory model, which requires understanding of the data present in the databases. Enterprise data is generally present in multiple tables and can include different data types. Understanding the types of data is important to the development of data models and planning modernization phases.

SUMMARY

Embodiments of the invention provide techniques for automatically determining different data types found in databases.

In one illustrative embodiment, a computer implemented method comprises receiving a portion of identifying information for one or more components of a database, and generating one or more descriptions for the one or more components based at least in part on the portion of the identifying information for the one or more components. The one or more descriptions are inputted to one or more machine learning models, and, using the one or more machine learning models, one or more data types associated with the one or more components are predicted. The prediction is based at least in part on the one or more descriptions.

Further illustrative embodiments are provided in the form of a computer program product comprising a non-transitory computer readable storage medium having embodied therein executable program code that when executed by a processor causes the processor to perform the above computer implemented method. Still further illustrative embodiments comprise an apparatus or system with a processor and a memory configured to perform the above computer implemented method.

These and other features and advantages of embodiments described herein will become more apparent from the accompanying drawings and the following detailed description.

BRIEF DESCRIPTION OF THE DRAWINGS

FIG. 2 depicts a chart of example database tables, corresponding table descriptions and corresponding data types according to an illustrative embodiment.

FIG. 3 depicts a table comprising example database tables, corresponding table descriptions and corresponding data types according to an illustrative embodiment.

FIGS. 4A and 4B depict listings of example database table names according to an illustrative embodiment.

FIG. 4C depicts a table of example database terms and their corresponding definitions according to an illustrative embodiment.

FIG. 5 depicts a table including example expansions of component names according to an illustrative embodiment.

DETAILED DESCRIPTION

Figure 1:
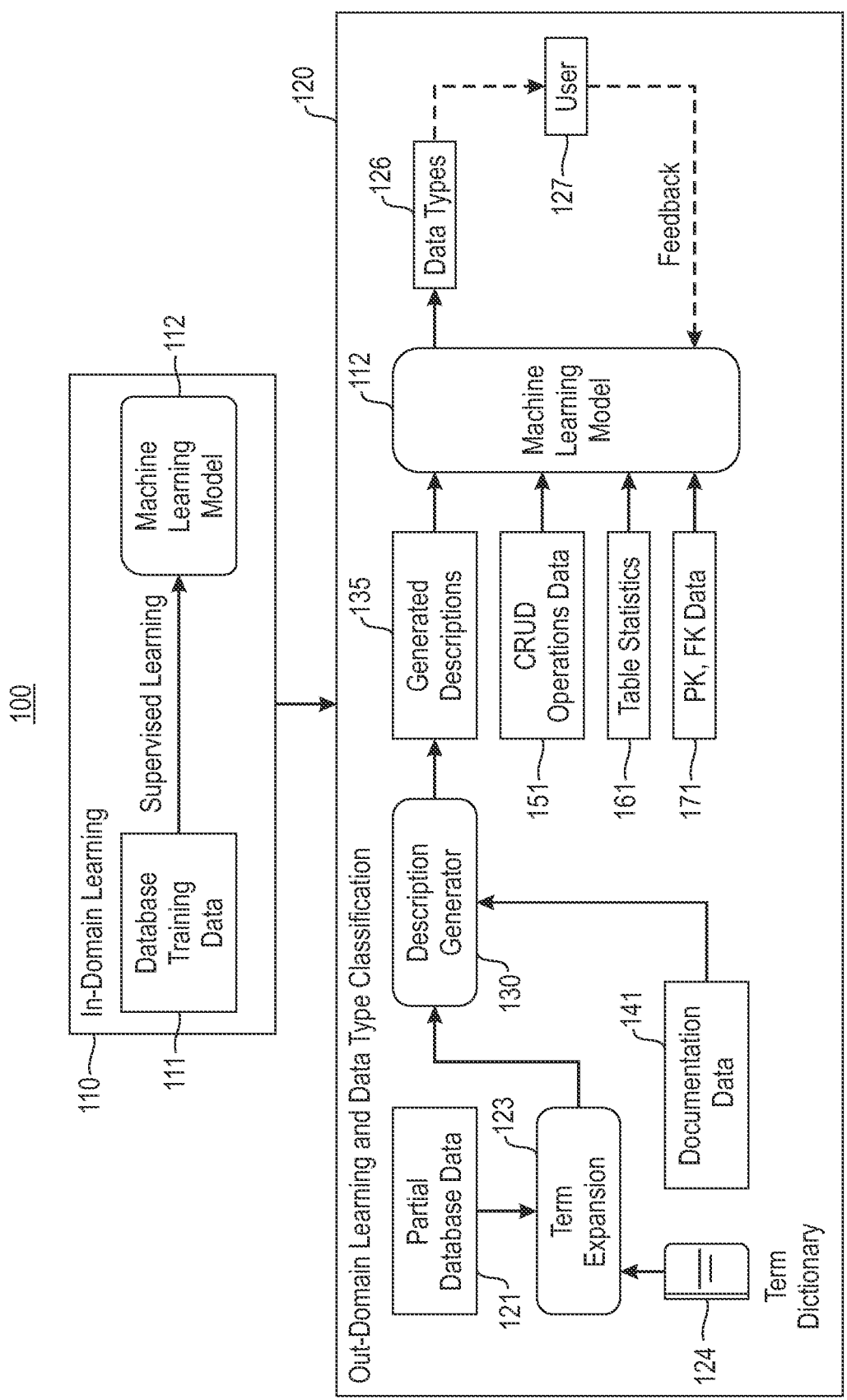
FIG. 1 illustrates a system for data type classification according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass a wide variety of processing systems, by way of example only, processing systems comprising cloud computing and storage systems as well as other types of processing systems comprising various combinations of physical and/or virtual processing resources.

As mentioned above in the background section, understanding the different types of enterprise data is important to the development of data models and planning data modernization phases. The different types of data may comprise, for example, master data, reference data and transaction data. Master data includes, but is not necessarily limited to, information about entities (e.g., persons, customers, suppliers, vendors, employees, etc.), places (e.g., locations, geography, enterprise sites, etc.), products, materials, vehicles and other items which may be important to an enterprise. Reference data includes, for example, additional information to make data complete, and define the set of permissible values to be used by other data fields. Examples of reference data include, but are not necessarily limited to, countries, units of measurement, fixed conversion formulas, exchange rates, codes, etc. Transaction data includes, but is not necessarily limited to, information about enterprise transactions and/or events such as, for example, orders, attendance, sales, invoices, etc. Transaction data is typically associated with a timestamp. In general, relative to master and reference data, transaction data changes frequently and is more dynamic.

There are difficulties with managing the different types of data. For example, master data may have consistency issues, and transaction data can be difficult to manage due to the volume of transaction data and the decentralized ways that different enterprise departments handle transaction data. When moving data from legacy databases to modern databases, enterprises may provide data modernization service providers with limited metadata corresponding to, for example, database components, such as database tables and columns, without access to the actual data. In such cases, it is difficult to determine the data types, making data modernization modeling and planning challenging. Under conventional approaches, having subject matter experts (SMEs) label data manually is an inefficient and costly operation.

Illustrative embodiments address the above and other challenges by providing techniques for automatically mapping portions of database component information to different data types. According to one or more embodiments, partial data table information, such as, for example, table and/or column names, is automatically mapped to different data types. In an embodiment, descriptions of database components are generated and inputted to a machine learning model trained with labeled training data comprising a plurality of data types corresponding to respective ones of a plurality of database components and respective ones of a plurality of descriptions of the database components. The machine learning model predicts data types based on the inputted database component descriptions.

FIG. 1 depicts a system 100 for data type classification according to an illustrative embodiment. As shown in FIG. 1 by lines and/or arrows, the components of the system 100 are operatively connected to each other via, for example, physical connections, such as wired and/or direct electrical contact connections, and/or wireless connections, such as, for example, WiFi, BLUETOOTH, IEEE 802.11, and/or other networks, including but not limited to, a local area network (LAN), wide area network (WAN), cellular network, ad hoc networks (e.g., wireless ad hoc network (WANET)), satellite network or the Internet. For example, a network can operatively link the in-domain learning engine 110 to the out-domain learning and data type classification engine 120 and the components thereof.

The system 100 comprises an in-domain learning engine 110. In the in-domain learning engine 110, a machine learning model 112 is trained with database training data 111 (e.g., database table metadata) using supervised learning techniques. For example, referring to the table 200 in FIG. 2 and the table 300 in FIG. 3, the database training data comprises labeled data including a plurality of data types (e.g., reference, master, transaction) corresponding to respective ones of a plurality of database table names and respective ones of a plurality of database table descriptions. In some cases, the database component names (e.g., table names, column names, row names) comprise abbreviations or acronyms. In the table 200, table name "CURR_EX-CG_RATE" corresponds to a table description of "currency exchange rates" and a "reference" data type. In another example, in the table 300, table name "CUS_INF" corresponds to a table description of "Customer Information File" and a "Master" data type. In some cases, the database component names (e.g., table names, column names, row names) are the same or similar to the component descriptions. For example, in the table 300, table name "Backorder_Action_Codes" refers to the table description "Backorder Action Codes" and a "Reference" data type. The data types may be inferred from certain words in the component descriptions and/or in the component names. For example, the bolded words "Codes," "Invoice" and "Customer" appearing in the table descriptions in FIG. 3 relate to "Reference," "Transaction" and "Master" data types, respectively. Similarly, the word "Codes" and abbreviations "Inv" and "Cus" appear in the table names in the table 300 of FIG. 3. In the in-domain setting, the database training data 111 includes, for example, component names (e.g., table, column and/or row names), descriptions of these components and their corresponding data types. Supervised learning is performed to train the machine learning model 112 to predict data types given component names and/or component descriptions. The machine learning model 112 comprises, for example, support vector machines (SVMs), random forest and/or logistics regression models.

The system 100 further comprises an out-domain learning and data type classification engine 120. The out-domain learning and data type classification engine 120 includes a description generator 130 that generates component descriptions (Generated Descriptions 135) which are inputted to the machine learning model 112. Based on the inputted generated descriptions 135, the machine learning model 112 predicts data types corresponding to the generated descriptions 135. In more detail, as noted above, when moving data from legacy databases to modern databases, enterprises provide data modernization service providers with limited metadata corresponding to, for example, database components, such as database tables and columns, without access to the actual data. The limited metadata is referred to as the partial database data 121 in FIG. 1. Referring to FIGS. 4A and 4B, examples of the partial database data 121 include lists 401 and 402 of table names without corresponding table descriptions or data types. In the list 401, the table names comprise phrases or other combinations of words related to the type of data that is in a given table of a database, such as, for example, "Invoice_Registry," "Geographic_Location_Details," "Purchase_Order_Data," etc. In the list 402, the table names comprise abbreviations or acronyms related to the type of data that is in a given table of a database, such as, for example, "ACTCDE," "AP_TERMS," "ORDDT," "FRTCHRG," etc. The partial database data 121 is not limited to table names, and may comprise other component identifying information such as, for example, column names and row names for database tables.

The partial database data 121 (e.g., partial metadata of databases) is inputted to a term expansion layer 123, which expands acronyms and/or abbreviations in the partial database data 121 (e.g., in the table names, row names or column names) into the words which the acronyms and/or abbreviations represent. In connection with the expansion, since certain terms may have different meanings depending on the enterprise, one or more enterprise-wide term dictionaries 124 are used to map the table names, row names and/or column names to text descriptions for a given enterprise. For example, referring to the table 403 in FIG. 4C, in an example of a term dictionary 124, the terms (e.g., abbreviations or acronyms) "AP," "ORD," "BOL" and "FRT" respectively correspond to the following definitions: "Accounts Payable," "Order," "Bill of Lading" and "Freight."

In expanding the one or more acronyms and the one or more abbreviations, the term expansion layer 123 extracts a plurality of character-grams from the component descriptions in the partial database data 121 (e.g., from the column names, row names and/or the table names). As used herein, the character-grams comprise character segments (also referred to herein as "n-grams"). As used herein, n-grams or character-grams refer to segments of a plurality of characters, for example, but not necessarily limited to, n number of letter, numeric and/or alphanumeric characters, which are derived from text identifying the database component (where n is an integer). An n-gram can include a continuous sequence of letters, which may form part of a word (e.g., phoneme, syllable) or a word. For example, a table description "Invoice Transactions Messages" can result in a character-gram table name "INVTRM."

The term expansion layer 123 orders the plurality of character-grams according to frequency of occurrence, and identifies a subset of the plurality of character-grams exceeding a threshold number of occurrences. The subset of the character-grams (e.g., top-k character-grams, where k is an integer) are mapped to text using a term dictionary 124. For example, referring to FIG. 5, a table 500 includes an example output of the term expansion layer 123 comprising expansions of table and column names. As shown in FIG. 5, a table name is "Backorder_Act_Codes" and column names include "Act_Code," "Act_Type," "Desc," "Display_Seq," "Ctry_Cde," "Maint_User_Id" and "Maint_Timestamp." The table 500 lists the corresponding character/n-grams as "Act Code," "Act Type," "Desc," "Display Seq," "Ctry Cde," "Maint User Id" and "Maint Timestamp." The expanded terms generated by the term expansion layer 123 are "Action" for "Act," "Description" for "Desc," "Sequence" for "Seq" "Country" for "Ctry," "Code" for "Cde" and "Maintenance" for "Maint."

In accordance with one or more embodiments, the term expansion layer 123 takes non-English character/n-grams (e.g., short-forms, abbreviations, acronyms, etc.) and translates them into English (e.g., Act→Action, Txn→Transaction). The short-forms or abbreviations may comprise words where the vowels have been removed (e.g., Order→Ordr, Action→Actn Order→Ordr, Action→Actn), or where the first syllable of the word is used (e.g., Transaction→Tran, Description→Des). Acronyms include, for example, the first letter of each word (e.g., Accounts Payable→AP). The term expansion layer 123 uses a convolutional neural network (CNN) and/or a recurrent neural network (RNN) to expand the short-forms, acronyms and/or abbreviations in the component names by selecting the best local translation from a plurality of options based on the surrounding words.

The CNN and/or the RNN may be trained with training data comprising respective ones of a plurality of acronyms and/or a plurality of abbreviations paired with respective ones of a plurality of definitions that may be found in one or more term dictionaries (e.g., term dictionary 124, an example of which is shown in FIG. 4C). For example, in the case of a function (maint_UserId_Timestamp(String userId, Timestamp timestamp)) and its associated description (Maintenance of UserID and Timestamp for Action Codes), training data includes the pair of the terms "maint userid timestamp" and the description "Maintenance of UserID and Timestamp for Action Codes."

Referring back to FIG. 1, the output of the term expansion layer 123 and documentation data 141 are input to a description generator 130, which generates component descriptions based on the expanded terms and the documentation data 141. The generated descriptions 135 are input to the trained machine learning model 112, which predicts data types for the components based on the generated descriptions 135. The documentation data 141 comprises, for example, comments text in source files (e.g., JAVA® documentation) to collect domain words. The collected domain words are used to map character-grams to words. In one or more embodiments, the documentation data 141 includes enterprise functions and associated descriptions noted above.

Figure 6:
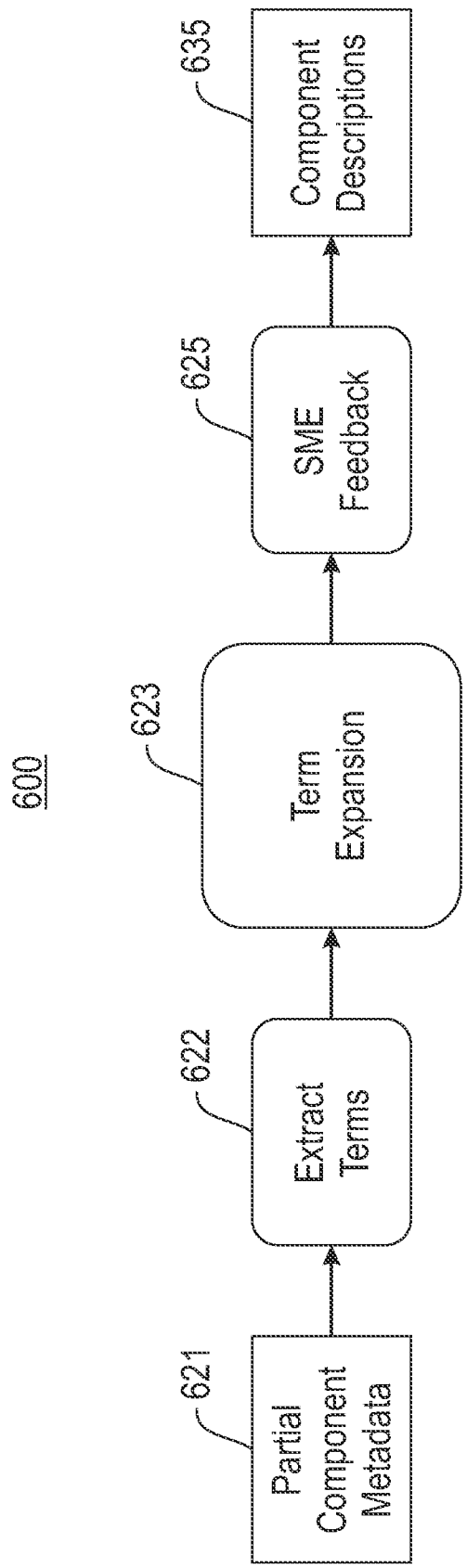
FIG. 6 depicts an operational flow for the generation of component descriptions according to an illustrative embodiment.

Referring to the operational flow 600 for the generation of component descriptions in FIG. 6, in block 622 terms (e.g., character-grams) from the partial database component metadata 621 (e.g., table, column and/or row names) are extracted and arranged in descending order according to their frequency of occurrence, and the top-k terms are selected. At block 623, the top-k terms are expanded into words by, for example, the term expansion layer 123. At block 625, the expanded terms are provided to users (e.g., SMEs) who provide feedback on whether the terms have been mapped to the correct words. Following SME feedback 625, and any corrections resulting therefrom, the expanded terms are provided to the description generator, which generates the component descriptions 635 missing from the partial database component metadata 621.

As shown in FIG. 1, the generated descriptions 135 (or component descriptions 635) are inputted to the trained machine learning model 112, which predicts data types 126 associated with the components (e.g., tables, rows and/or columns) based at least in part on the generated descriptions 135/635. According to one or more embodiments, the prediction of the data types 126 is further based on create, read, update and delete (CRUD) operations data 151, table statistics 161 and/or primary key (PK) and foreign key (FK) data 171 of a given database or database component, which may be inputted to the machine learning model 112.

For example, CRUD operations data 151 may comprise counts of the number of data reads, writes, deletes, updates over a given time period (e.g., inserts/day, deletes/day, updates/day) for a given database or database component. A high frequency of CRUD operations may indicate that the given database or database component stores transaction type data, whereas a low frequency of CRUD operations may indicate that the given database or database component stores reference type data, as reference data generally remains unchanged and transaction data is continuously being updated. A mid-range frequency of CRUD operations may indicate that the given database or database component stores master type data. The machine learning model 112 is trained to recognize the differences in frequency of CRUD operations as indicating different data types, which the machine learning model 112 can use as a factor when predicting the data types 126.

Table statistics 161 may comprise counts of the number of records and/or attributes for a given database or database component. A high number of records and/or attributes may indicate that the given database or database component stores transaction type data, whereas a low number of records and/or attributes may indicate that the given database or database component stores reference type data, as reference databases or database components are relatively smaller, comprising less records and attributes than transaction databases or database components, which are relatively larger. A mid-range number of records and/or attributes may indicate that the given database or database component stores master type data. The machine learning model 112 is trained to recognize the differences in the number of records and/or attributes as indicating different data types, which the machine learning model 112 can use as a factor when predicting the data types 126.

Primary key (PK) and foreign key (FK) data 171 relates to relationships between tables in a database. For example, a primary key-foreign key relationship can define a one-to-many relationship between two tables in a relational database. A foreign key may correspond to a column or a set of columns in one table that references primary key columns in another table. A primary key may correspond to a column or set of columns where each value is unique and identifies a single row of the table. A column of customer IDs is an example of a primary key. Reference tables may not have foreign keys, and when they do, the foreign key may have a relationship with a primary key in another reference table. The machine learning model 112 is trained to recognize a different primary key-foreign key relationship as indicating different data types, which the machine learning model 112 can use as a factor when predicting the data types 126. The use of CRUD operations data 151, table statistics 161 and/or PK and FK data 171 is optional, and prediction of data types by the machine learning model 112 can be performed without one or more of the CRUD operations data 151, table statistics 161 and/or PK and FK data 171.

The predicted data types 126 for a given database component are transmitted to one or more users 127 via, for example, one or more user devices. A user device can include, but is not necessarily limited to a personal computer (PC), portable computer, and/or smart mobile device, such as a smart phone or tablet that can, for example, transmit and receive data via a network. A user 127 (e.g., SME) provides feedback via a user device to the machine learning model 112 regarding the accuracy of the predicted data types 126. The machine learning model 112 is re-trained based at least in part on the feedback. The user 127 uses the data types 126 to plan data modernization processes and model databases in connection with data modernization tasks.

Figure 7:
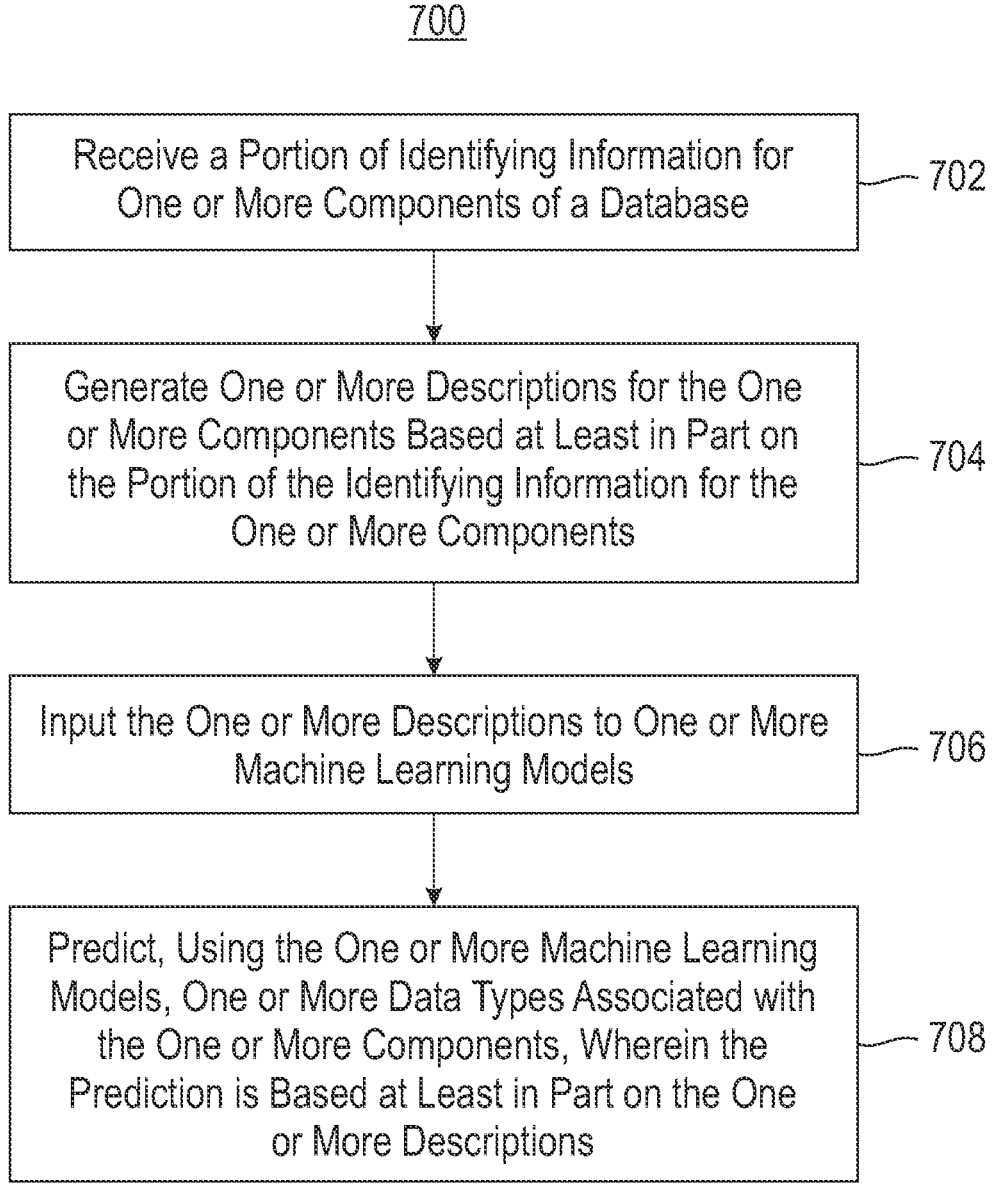
FIG. 7 illustrates a data type classification process flow according to an illustrative embodiment.

Taking into account the above and other features described herein, FIG. 7 illustrates a data type classification methodology 700 that predicts data types based on partial database data.

In step 702, a portion of identifying information for one or more components of a database is received. The one or more components comprise one or more columns, one or more rows and/or one or more tables of the database, and the portion of the identifying information comprises one or more column names, one or more row names and/or one or more table names. The one or more column names, the one or more row names and the one or more table names comprise one or more acronyms and/or one or more abbreviations In step 704, one or more descriptions for the one or more components are generated based at least in part on the portion of the identifying information for the one or more components. Generating the one or more descriptions for the one or more components comprises expanding the one or more acronyms and the one or more abbreviations into one or more words. A CNN and/or an RNN is used to expand the one or more acronyms and the one or more abbreviations into the one or more words. The CNN and/or the RNN are trained with training data comprising respective ones of at least one of a plurality of acronyms and a plurality of abbreviations paired with respective ones of a plurality of definitions.

Expanding the one or more acronyms and the one or more abbreviations comprises extracting a plurality of character-grams from the one or more column names, the one or more row names and the one or more table names, ordering the plurality of character-grams according to frequency of occurrence, and identifying a subset of the plurality of character-grams exceeding a threshold number of occurrences.

In step 706, the one or more descriptions are inputted to one or more machine learning models. In step 708, using the one or more machine learning models, one or more data types associated with the one or more components are predicted. The prediction is based at least in part on the one or more descriptions.

The one or more machine learning models are trained with labeled training data comprising respective ones of a plurality of data types corresponding to respective ones of a plurality of database components and respective ones of a plurality of descriptions of the database components.

According to one or more embodiments, CRUD operations data, table statistics and/or PK-FK relationships of the database or database components are inputted to the one or more machine learning models, wherein the prediction is based at least in part on the CRUD operations data, table statistics and/or PK-FK relationships.

According to one or more embodiments, the one or more data types associated with the one or more components are transmitted to one or more users via one or more user devices. Feedback from the one or more users regarding accuracy of the one or more data types is received by the one or more machine learning models, and the one or more machine learning models are re-trained based at least in part on the feedback.

The techniques depicted in FIGS. 1-7 can also, as described herein, include providing a system, wherein the system includes distinct software modules, each of the distinct software modules being embodied on a tangible computer readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer readable recordable storage medium with code adapted to be executed to carry out at least one method step described herein, including the provision of the system with the distinct software modules.

Additionally, the techniques depicted in FIGS. 1-7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
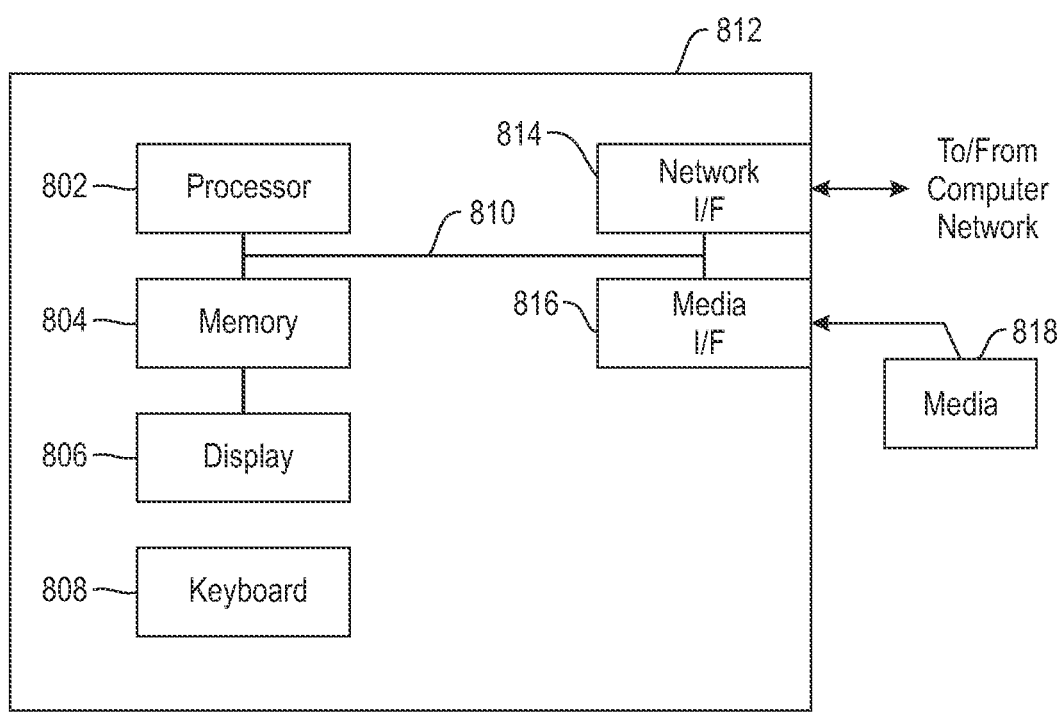
FIG. 8 illustrates an exemplary information processing system according to an illustrative embodiment.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a multi-core CPU, GPU, FPGA and/or other forms of processing circuitry such as one or more ASICs. Further, the term "processor" may refer to more than one individual processor. The term "memory" is intended to include memory associated with a processor (e.g., CPU, GPU, FPGA, ASIC, etc.) such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of embodiments of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICs), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
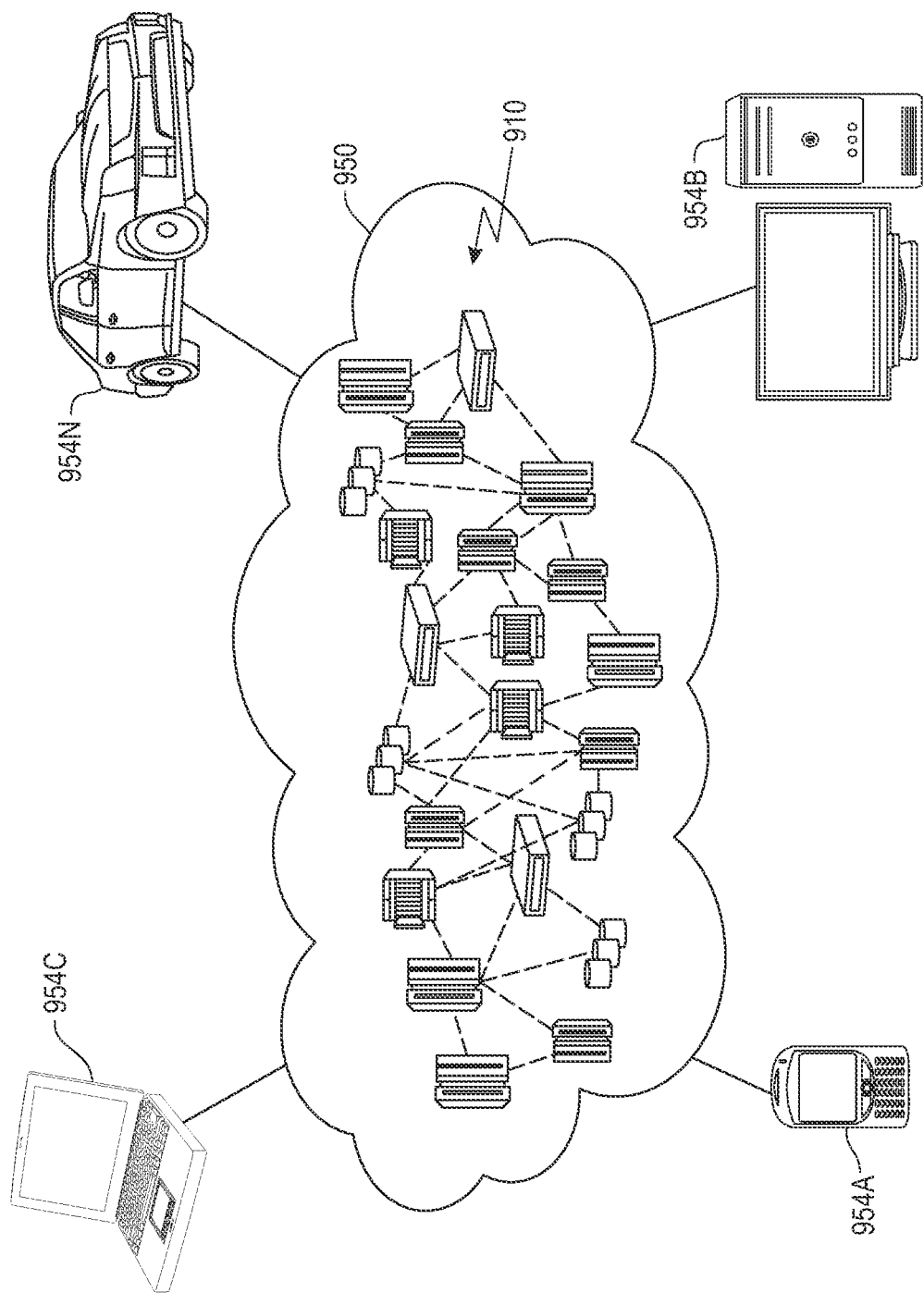
FIG. 9 illustrates a cloud computing environment according to an illustrative embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
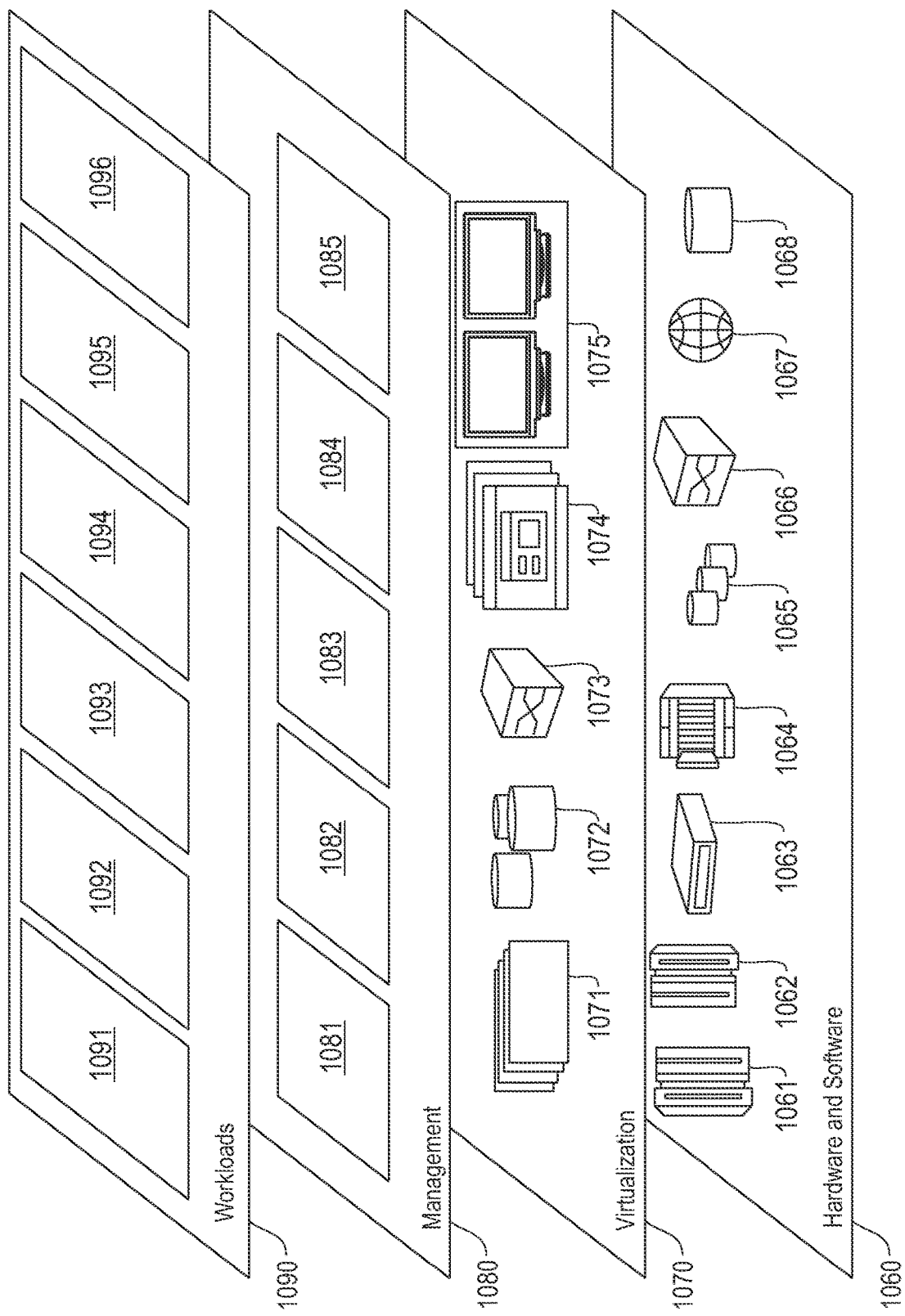
FIG. 10 illustrates abstraction model layers according to an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture-based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075. In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and data type prediction 1096, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The embodiments advantageously provide for automated classification of database table types with limited metadata. At least one embodiment of the present invention may provide a beneficial effect such as, for example, a framework (e.g., a set of one or more framework configurations) for automatically applying an in-domain machine learning model trained with labeled training data to an out-domain setting receiving partial database metadata as an input. The embodiments complete the partial metadata by using the machine learning model to generate data type descriptions of database components based on received component identifiers in the form of abbreviations and acronyms. In one or more embodiments, the character-grams are automatically expanded with a fully automated deep translation-based method that associates code-embedded text, such as variable/function descriptions, with domain acronyms and/or abbreviations.

As an additional advantage, the embodiments provide techniques for automatically determining different data types found in, for example, database tables. For example, the embodiments provide techniques for mapping table, row and/or column names to text descriptions via a term dictionary and for classifying the data tables without labeled samples from a client setting. The embodiments further utilize static and dynamic code information such as, for example, CRUD operation access patterns, table statistics and PK-FK relationships for data type classification.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by one or more processors to cause the one or more processors to:
   receive a portion of identifying information for one or more components of a database;
   generate one or more descriptions for the one or more components based at least in part on the portion of the identifying information for the one or more components;
   input the one or more descriptions and create, read, update and delete operations data of the database to one or more machine learning models;
   predict, using the one or more machine learning models, one or more data types associated with the one or more components, wherein the prediction is based at least in part on the one or more descriptions and the create, read, update and delete operations data;
   wherein the predicting comprises:
   extracting from the create, read, update and delete operations data counts of a number of one or more of data reads, data writes, data deletes and data updates over a given time period for the one or more components; and
   determining, based at least in part on the counts, the one or more data types associated with the one or more components; and
   wherein the program instructions further cause the one or more processors to train the one or more machine learning models with: (i) labeled training data comprising respective ones of a plurality of data types corresponding to respective ones of a plurality of database components and respective ones of a plurality of descriptions of the database components; and (ii) data comprising correspondence between the respective ones of the plurality of data types and frequency of create, read, update and delete operations.

2. The computer program product of claim 1, wherein the one or more components comprise at least one of one or more columns, one or more rows and one or more tables of the database, and the portion of the identifying information comprises at least one of one or more column names, one or more row names and one or more table names.

3. The computer program product of claim 2, wherein the one or more column names, the one or more row names and the one or more table names comprise at least one of one or more acronyms and one or more abbreviations.

4. The computer program product of claim 3, wherein, in generating the one or more descriptions for the one or more components, the program instructions cause the one or more processors to expand the one or more acronyms and the one or more abbreviations into one or more words.

5. The computer program product of claim 4, wherein the program instructions further cause the one or more processors to use one of a convolutional neural network and a recurrent neural network to expand the one or more acronyms and the one or more abbreviations into the one or more words.

6. The computer program product of claim 5, wherein the program instructions further cause the one or more processors to train one of the convolutional neural network and the recurrent neural network with training data comprising respective ones of at least one of a plurality of acronyms and a plurality of abbreviations paired with respective ones of a plurality of definitions.

7. The computer program product of claim 4, wherein, in expanding the one or more acronyms and the one or more abbreviations, the program instructions cause the one or more processors to:
   extract a plurality of character-grams from the one or more column names, the one or more row names and the one or more table names;
   order the plurality of character-grams according to frequency of occurrence;
   identify a subset of the plurality of character-grams exceeding a threshold number of occurrences.

8. The computer program product of claim 1, wherein the program instructions further cause the one or more processors to input table statistics of the database to the one or more machine learning models, wherein the prediction is based at least in part on the table statistics.

9. The computer program product of claim 1, wherein the program instructions further cause the one or more processors to input at least one of foreign key relationships and primary key relationships of the database to the one or more machine learning models, wherein the prediction is based at least in part on at least one of the foreign key relationships and the primary key relationships.

10. The computer program product of claim 1, wherein the program instructions further cause the one or more processors to transmit the one or more data types associated with the one or more components to one or more users via one or more user devices.

11. The computer program product of claim 10, wherein the program instructions further cause the one or more processors to:
    receive feedback from the one or more users regarding accuracy of the one or more data types; and
    train the one or more machine learning models based at least in part on the feedback.

12. A computer implemented method, comprising:
    receiving a portion of identifying information for one or more components of a database;
    generating one or more descriptions for the one or more components based at least in part on the portion of the identifying information for the one or more components;
    inputting the one or more descriptions and create, read, update and delete operations data of the database to one or more machine learning models; and
    predicting, using the one or more machine learning models, one or more data types associated with the one or more components;
    wherein the prediction is based at least in part on the one or more descriptions and the create, read, update and delete operations data;
    wherein the predicting comprises:
    extracting from the create, read, update and delete operations data counts of a number of one or more of data reads, data writes, data deletes and data updates over a given time period for the one or more components; and
    determining, based at least in part on the counts, the one or more data types associated with the one or more components; and
    wherein the computer implemented method further comprises training the one or more machine learning models with: (i) labeled training data comprising respective ones of a plurality of data types corresponding to respective ones of a plurality of database components and respective ones of a plurality of descriptions of the database components; and (ii) data comprising correspondence between the respective ones of the plurality of data types and frequency of create, read, update and delete operations; and wherein the computer implemented method is performed by at least one processing device comprising a processor coupled to a memory when executing program code.

13. The computer implemented method of claim 12, wherein the one or more components comprise at least one of one or more columns, one or more rows and one or more tables of the database, and the portion of the identifying information comprises at least one of one or more column names, one or more row names and one or more table names.

14. The computer implemented method of claim 13, wherein the one or more column names, the one or more row names and the one or more table names comprise at least one of one or more acronyms and one or more abbreviations.

15. The computer implemented method of claim 14, wherein generating the one or more descriptions for the one or more components comprises expanding the one or more acronyms and the one or more abbreviations into one or more words.

16. An apparatus, comprising:
at least one processing device comprising a processor coupled to a memory, the at least one processing device, when executing program code, is configured to:
receive a portion of identifying information for one or more components of a database;
generate one or more descriptions for the one or more components based at least in part on the portion of the identifying information for the one or more components;
input the one or more descriptions and create, read, update and delete operations data of the database to one or more machine learning models; and
predict, using the one or more machine learning models, one or more data types associated with the one or more components, wherein the prediction is based at least in part on the one or more descriptions and the create, read, update and delete operations data;

wherein the predicting comprises:
extracting from the create, read, update and delete operations data counts of a number of one or more of data reads, data writes, data deletes and data updates over a given time period for the one or more components; and
determining, based at least in part on the counts, the one or more data types associated with the one or more components; and
wherein the at least one processing device is further configured to train the one or more machine learning models with: (i) labeled training data comprising respective ones of a plurality of data types corresponding to respective ones of a plurality of database components and respective ones of a plurality of descriptions of the database components; and (ii) data comprising correspondence between the respective ones of the plurality of data types and frequency of create, read, update and delete operations.

17. The apparatus of claim 16, wherein the one or more components comprise at least one of one or more columns, one or more rows and one or more tables of the database, and the portion of the identifying information comprises at least one of one or more column names, one or more row names and one or more table names.

18. The apparatus of claim 17, wherein the one or more column names, the one or more row names and the one or more table names comprise at least one of one or more acronyms and one or more abbreviations.

19. The apparatus of claim 18, wherein, in generating the one or more descriptions for the one or more components, the at least one processing device is configured to expand the one or more acronyms and the one or more abbreviations into one or more words.

20. The apparatus of claim 19, wherein the at least one processing device is further configured to use one of a convolutional neural network and a recurrent neural network to expand the one or more acronyms and the one or more abbreviations into the one or more words.

\* \* \* \* \*